United States Patent [19]

Ahmed et al.

[11] Patent Number: 5,291,103
[45] Date of Patent: Mar. 1, 1994

[54] SYSTEM FOR CONTROLLING POWER WINDOWS OF VEHICLES

[75] Inventors: Moin Ahmed, Holly; Arthur W. Fornell, Livonia, both of Mich.

[73] Assignee: Chrysler Corporation, Highland Park, Mich.

[21] Appl. No.: 994,155

[22] Filed: Dec. 21, 1992

[51] Int. Cl.⁵ .............................................. H02K 7/14
[52] U.S. Cl. ....................... 318/3; 318/434; 318/264; 318/286; 318/466; 318/293
[58] Field of Search ........... 318/434, 264–266, 318/286, 466–468, 293, 3

[56] References Cited

U.S. PATENT DOCUMENTS

| | | | |
|---|---|---|---|
| 3,400,232 | 9/1968 | Mathey | 200/18 |
| 4,146,826 | 3/1979 | Wojslawowicz | 318/293 |
| 4,701,629 | 10/1987 | Citroen | 307/10 R |
| 4,775,862 | 1/1989 | Linden | 200/6 A |
| 4,801,812 | 1/1989 | Brusasco | 307/10 R |
| 4,857,813 | 8/1989 | Matsumoto et al. | 318/266 |
| 4,896,084 | 1/1990 | Maue et al. | 318/293 |
| 4,899,063 | 2/1990 | Suck | 318/266 |
| 4,990,835 | 2/1991 | Ohnishi et al. | 318/116 |
| 5,089,715 | 2/1992 | Kokubu | 307/10.1 |
| 5,187,381 | 2/1993 | Iwasa et al. | |

*Primary Examiner*—William M. Shoop, Jr.
*Assistant Examiner*—Karen Masih
*Attorney, Agent, or Firm*—Wendell K. Fredericks

[57] ABSTRACT

A power window system for a four window vehicle has a console module positioned proximate the front seats of the vehicle, which console module has operating switches for the front windows and a mode selection switch thereon. The rear windows are normally operated by a pair of rear window operating switches disposed proximate the rear windows. When the mode selection switch is in the first position, front operating switches operate the front windows and the rear operating switches operate the rear windows. When the mode selection switch is in the second position, the rear operating switches are disabled and the front operating switches operate only the front windows. When the mode selection switch is in the third position, the front operating switches operate only the rear windows. An array of indicator lights is provided on the module to indicate which switches are active and what function they perform.

15 Claims, 7 Drawing Sheets

| SWITCH 70 POSITION / TERMS. C TO 1 | SWITCHES / CKTS. | LF MOTOR 102 |  |  | RF MOTOR 104 |  |  | LR MOTOR 106 |  |  | RR MOTOR 108 |  |  |
|---|---|---|---|---|---|---|---|---|---|---|---|---|---|
|  |  | D OFF | UP | DN | D OFF | UP | DN | D OFF | UP | DN | D OFF | UP | DN |
| 1 | 40 a1-b1<br>a2-b1<br>a1-b2 | X | X | X |  |  |  |  |  |  |  |  |  |
|  | 42 a1-b1<br>a2-b1<br>a1-b2 |  |  |  | X | X | X |  |  |  |  |  |  |
|  | 52 a1-b1<br>a2-b1<br>a1-b2 |  |  |  |  |  |  | X | X | X |  |  |  |
|  | 54 a1-b1<br>a2-b1<br>a1-b2 |  |  |  |  |  |  |  |  |  | X | X | X |

D = DISABLED

FIG. 7

SWITCH 70 — POSITION 2 — TERMS. C TO 2

| SWITCHES / CKTS. | LF MOTOR 102 D OFF | LF MOTOR 102 UP | LF MOTOR 102 DN | RF MOTOR 104 D OFF | RF MOTOR 104 UP | RF MOTOR 104 DN | LR MOTOR 106 D OFF | LR MOTOR 106 UP | LR MOTOR 106 DN | RR MOTOR 108 D OFF | RR MOTOR 108 UP | RR MOTOR 108 DN |
|---|---|---|---|---|---|---|---|---|---|---|---|---|
| 40  a1-b1 | X | | | | | | | | | | | |
| 40  a2-b1 | | X | | | | | | | | | | |
| 40  a1-b2 | | | X | | | | | | | | | |
| 42  a1-b1 | | | | X | | | | | | | | |
| 42  a2-b1 | | | | | X | | | | | | | |
| 42  a1-b2 | | | | | | X | | | | | | |
| 52  a1-b1 | | | | | | | SD | | | | | |
| 52  a2-b1 | | | | | | | | SD | | | | |
| 52  a1-b2 | | | | | | | | | SD | | | |
| 54  a1-b1 | | | | | | | | | | SD | | |
| 54  a2-b1 | | | | | | | | | | | SD | |
| 54  a1-b2 | | | | | | | | | | | | SD |

D = DISABLED     SD = SWITCH DISABLED

FIG. 8

| SWITCH 70 | SWITCHES / CKTS. | | LF MOTOR 102 | | | RF MOTOR 104 | | | LR MOTOR 106 | | | RR MOTOR 108 | | |
|---|---|---|---|---|---|---|---|---|---|---|---|---|---|---|
| | | | D | OFF | UP | DN | D | OFF | UP | DN | D | OFF | UP | DN | D | OFF | UP | DN |
| POSITION 3 TERMS. C TO 3 | 40 | a1-b1 | MD | | | | | | | | | | | | | | |
| | | a2-b1 | MD | | | | | | | | | | | | | | |
| | | a1-b2 | MD | | | | | | | | | | | | | | |
| | 42 | a1-b1 | | | | | MD | | | | | X | | | | | |
| | | a2-b1 | | | | | MD | | | | | | X | | | | |
| | | a1-b2 | | | | | MD | | | | | | | X | | | |
| | 52 | a1-b1 | | | | | | | | | SD | | | | | X | | |
| | | a2-b1 | | | | | | | | | SD | | | | | | X | |
| | | a1-b2 | | | | | | | | | SD | | | | | | | X |
| | 54 | a1-b1 | | | | | | | | | | | | | | SD | | |
| | | a2-b1 | | | | | | | | | | | | | | SD | | |
| | | a1-b2 | | | | | | | | | | | | | | SD | | |

SYSTEM FOR CONTROLLING POWER WINDOWS OF VEHICLES

FIELD OF THE INVENTION

The instant invention relates to a system for controlling power windows of vehicles, and more particularly, the instant invention relates to a system for controlling power windows of vehicles wherein the vehicles include sets of front and rear windows in which each window of a set is individually controllable by switches on a module position proximate a driver's seat.

BACKGROUND OF THE INVENTION

Most four door vehicles with electrically operated power windows have a control module proximate the driver's seat. The module may be located between two front seats in a five passenger vehicle or on the driver's side door of a six passenger vehicle. In currently used configurations, the module includes a separate rocker or pushbutton switch for each window so that there are four rocker switches thereon. In addition to the rocker switches, the module usually includes a locking switch providing a feature for locking the passenger windows so that children in the back or right front seat cannot operate the windows without the driver unlocking the windows. This results in an array of five switches operable by the driver.

When a driver decides to open or close any window or to lock or unlock the rear windows, it is preferable that this task be as simple as possible.

In addition to the aforedescribed considerations, it is also desirable to decrease the expense of the various systems utilized in an automobile. If the expense of a particular system may be reduced while not compromising desirable qualities of the vehicle, then so much the better. If it is possible to reduce expense while enhancing other qualities of the vehicle, then the reduction in expense is certainly desirable. On way of reducing expense of a system is to reduce the number of components of the system. While this reduction in components may save only a modest amount per vehicle, if thousands of vehicles utilize the improvement, then the savings to the manufacturer and consumer can be significant, especially when combined with other cost reduction measures.

SUMMARY OF THE INVENTION

In view of the aforementioned considerations, it is an object of the instant invention to provide a new and improved system for controlling power windows wherein operation of the systems are simplified while decreasing the expense of the systems.

Upon further study of the specification and appended claims, further objects and advantages of this invention will become apparent to those skilled in the art.

In view of the aforementioned objects and other objects, the invention contemplates a power window system for a vehicle wherein the vehicle has sets of front and rear electrically operated windows in which each set includes a left and right hand window and wherein each window is raised and lowered by an electric motor and operating switch which is controlled by a motor switch which is ganged to a mode selector switch. The new and improved system utilizes a main module disposed proximate the driver's seat which has mounted thereon two operating switches for the front windows and mode selection switch connected to a power source of a power circuit, which mode selection switch is movable between first, second and third positions. When the mode selection switch is in the first position, all of the motors are connected through the motor switches to the power circuit so that the operating switch associated with each motor operates that motor. When the mode selection switch is in the second position, the operating switches for the front windows raise and lower the front windows; however, the motor switches controlling the rear windows are disabled so that the rear windows are not operable by either driver or passenger sitting in the front seats or those sitting in the back seats. When the mode selection switch is in the third position, the rear operating switches are disconnected and the front operating switches of the front windows are disconnected from the motors for the front windows and connected to the motors for the rear windows, whereby the operating switches normally associated with the front windows operate the rear windows.

In accordance with an additional embodiment of the invention, indicator lamps are provided which indicate which operating switches are active and what function they perform. At least one front indicator lamp is associated with the front windows and at least one primary rear indicator lamp and one secondary rear indicator lamp is associated with the rear windows. When the mode selection switch is in the first position, the front indicator lamp is illuminated and the primary rear indicator lamp is illuminated, indicating the operating switches on the console will raise and lower the front windows and the operating switches proximate the rear windows will raise and lower the rear windows. When the mode selection switch is in the second position, only the front indicator lamp is illuminated, indicating that the operating switch on the console will operate the front windows and the rear windows are inactive from all switches. When the mode selection switch is in the third position, the secondary left rear and right rear front indicator lamps are the only indicator lamps illuminated, indicating that only the front operating switches operate the rear windows.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
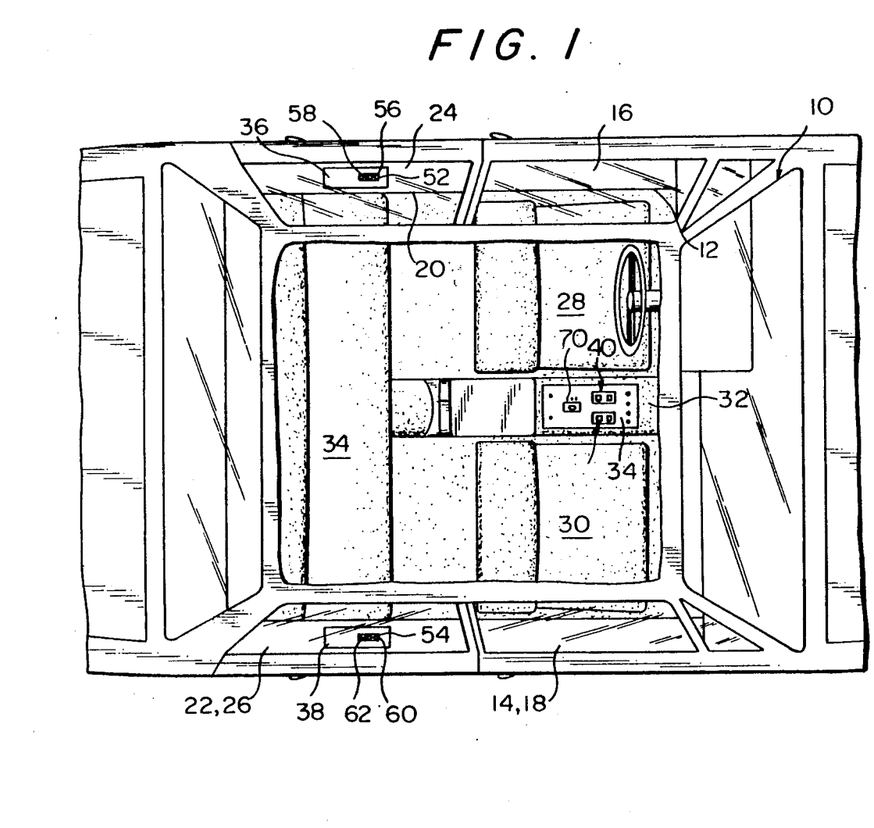
FIG. 1 is a perspective view of the cabin of a four door automobile having a window control module configured in accordance with the principles of the instant invention.

Referring now to the drawings, there is shown a cabin 10 of an automobile body, which cabin includes left and right front doors 12 and 14, which front doors include left and right front power windows 16 and 18. The cabin 10 also includes left and right rear doors 20 and 22 which include left and right rear power windows 24 and 26. Proximate the left front door 12 and left front window 16, there is a driver's seat 28, while proximate the right front door 14 and right front window 18, there is a front passenger seat 30. In accordance with a preferred embodiment of the invention, disposed between the front seats 28 and 30, there is a console 32 which has a control module 34 thereon. A rear bench seat or a pair of bucket seats 35 extend between the rear doors 20 and 22. Mounted on the left rear door 20, there is a left control module 36 and on the right rear door 22, there is a right control module 38.

Figure 2:
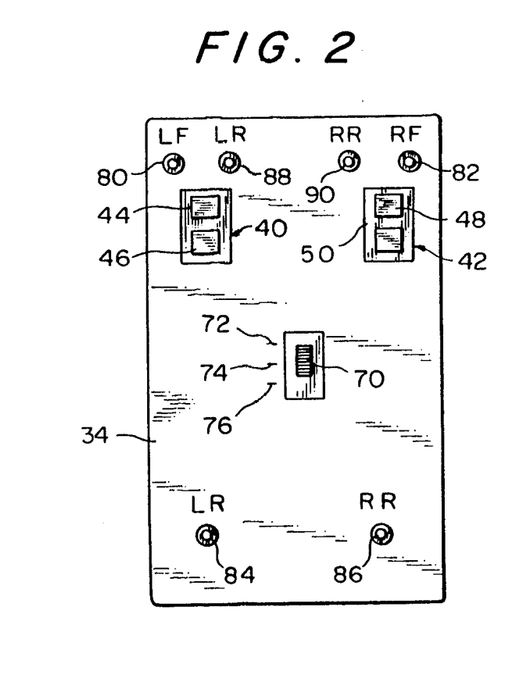
FIG. 2 is an enlarged planar view of the module of FIG. 1.

The modules 34, 36 and 38 each include switches for controlling the windows 16, 18, 24 and 26. In accordance with the principles of the instant invention, the console module 34 includes a left window operating switch 40 and a right window operating switch 42. The left window operating switch 40 has a first button 44 for raising the associated left front window 16 and a second button 46 for lowering the left, front window, while the right switch 42 has a first button 48 for raising the right front window 18 and a second button 50 for lowering the right front window. The rear module 36 has a left operating switch 52, while the right rear module 38 has a right operating switch 54. The left rear switch 52 has a first button 56 for raising the left rear window 24 and a second button 58 for lowering the left rear window, while the right switch 54 has a front button 60 for raising the right rear window 26 and a second button 62 for lowering the right rear window 26. While the term "button" is utilized, it is to be understood that the button pairs 44, 46; 48, 50; 56, 58; and 60, 62 may also be opposite ends of rocker switches.

In accordance with the principles of the instant invention, a mode selection switch 70 is mounted on the console module 34 and is slidable between first, second and third positions 72, 74 and 76, respectively, to select first, second and third operating modes. In the first operating mode, the switches 40 and 42 operate the left and right windows 16 and 18, respectively, the switch 52 on the rear door 20 operates the left rear window 24 and the switch 54 on the right rear door 22 operates the right rear window 26. When the mode selection switch 70 is in second position 74, the second mode occurs wherein the left and right rear switches 52 and 54 are disabled so that a person, such as a child sitting in the back seat 35, cannot operate the left and right rear windows 24 or 26. While the circuitry is in the second mode, the driver in the seat 28 or a person in the front seat 30 can operate the left and right front windows 16 and 18 by operating the left and right front switches 40 and 42, but cannot raise and lower the rear windows 24 and 26. When the mode selection switch 70 is placed in the third position 76, then the circuitry is in the third mode and the left and right front switches 40 and 42 operate the left and right rear windows 24 and 26, respectively, the left and right front windows 16 and 18, respectively, being disabled.

In order for the driver to know at a glance which of the switches 40, 42, 52 and 54 are active and what functions the switches perform, the console module 34 has sets of indicator lamps comprising a left front indicator lamp 80 and a right front indicator lamp 82, as well as a primary left rear window indicator lamp 84 and a primary right rear window indicator lamp 86, and a secondary left rear window indicator lamp 88 and a secondary right rear window indicator lamp 90. When the mode selection switch 70 is in the first position 72 and the circuitry is in the first mode, lamps 80, 82 are lit indicating that the front windows are operable by the switches 40 and 42 and the primary rear lamps 84 and 86 are lit indicating that the rear window switches 52 and 54 are active. When the switch 70 is in the second position 74 indicating that the circuitry is in the second mode, indicator lamps 80 and 82 are lit, showing that the switches 40 and 42 operate the front windows 16 and 18 while primary and secondary lamps 84, 86, 88 and 90 are extinguished indicating that the rear windows are not operable by any of the switches 40, 42, 52 or 54. When the mode selection switch 70 is in the third position 76 placing the circuitry in the third mode, only the secondary left rear window lamp 88 and secondary right rear window lamp 90 are lit, indicating that the operating switches 40 and 42 operate only the rear windows 24 and 26.

Figure 3:
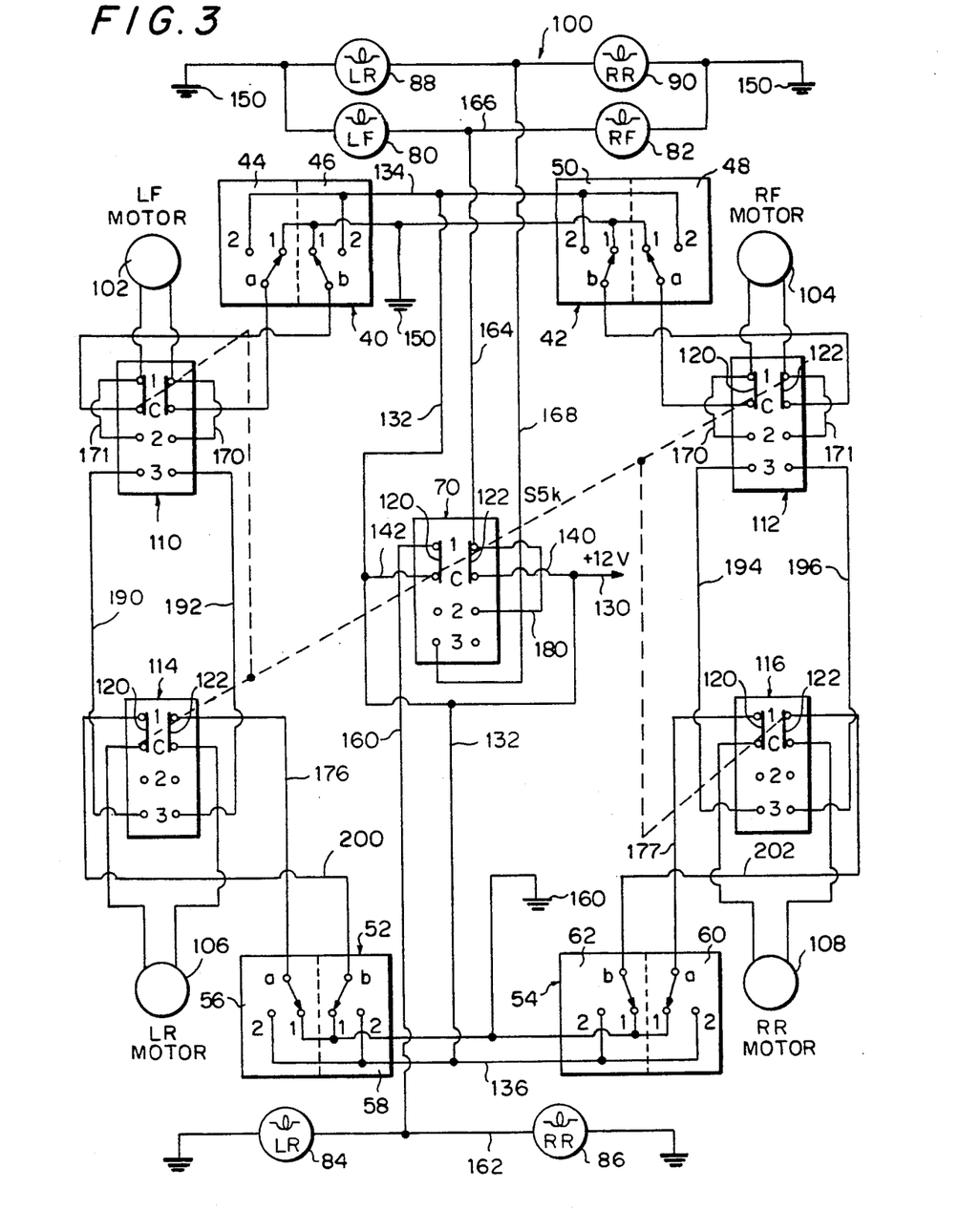
FIG. 3 is a schematic view showing a circuit diagram of a control circuit for operating electric window motors in accordance with the instant invention, the circuit being shown in a first mode.
Figure 4:
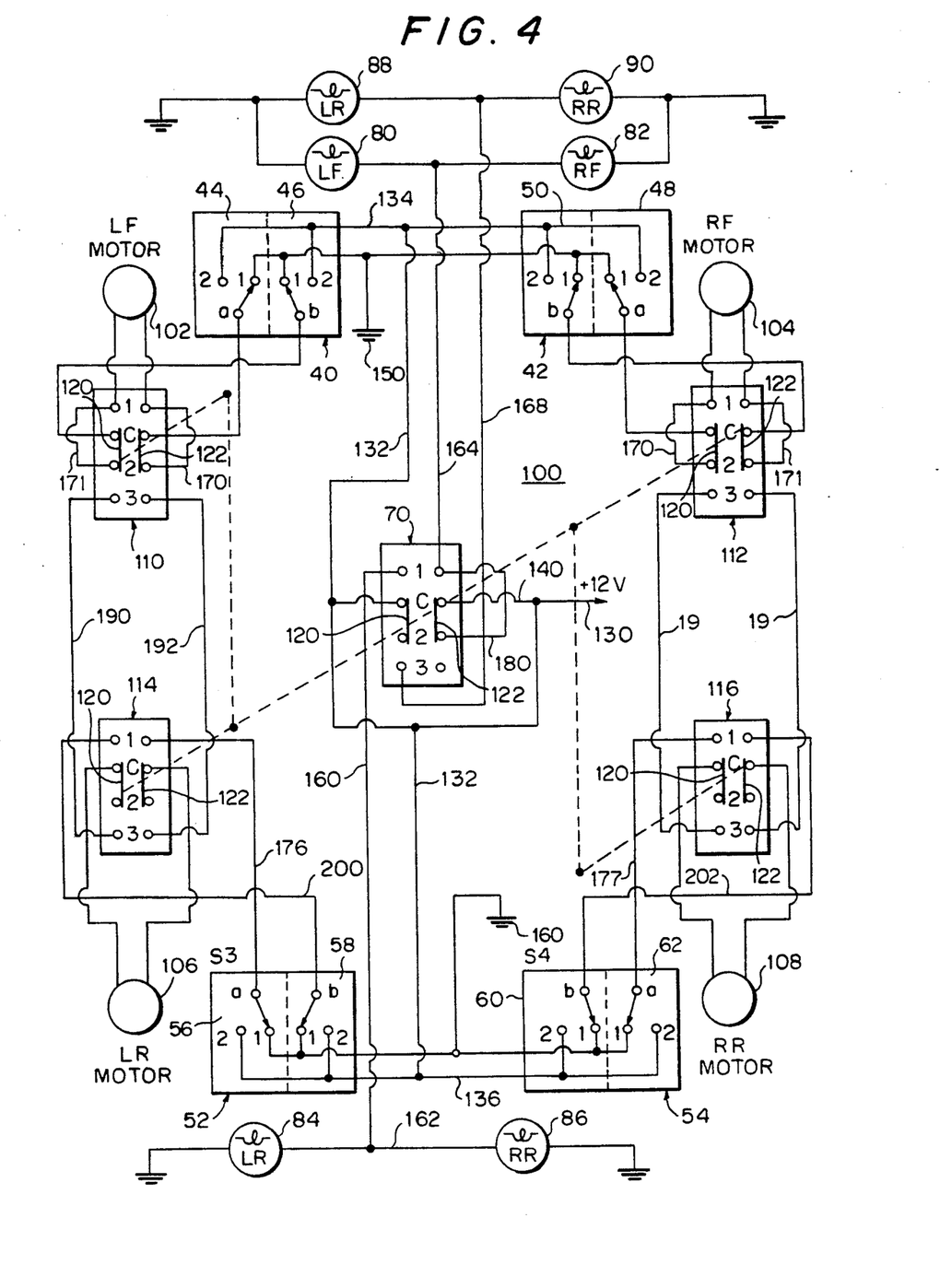
FIG. 4 is a view similar to FIG. 3, but showing the circuit in a second mode.
Figure 5:
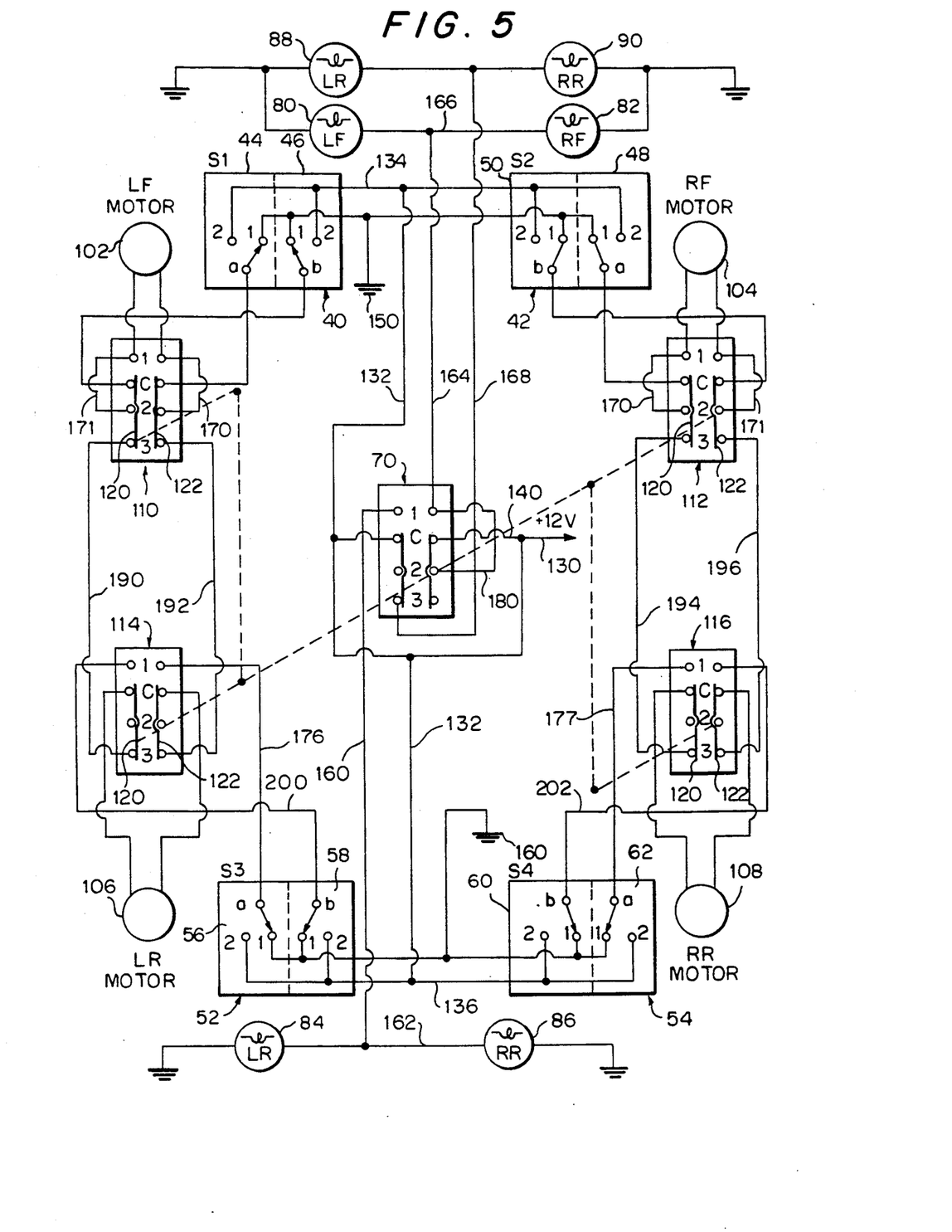
FIG. 5 is a view similar to FIGS. 3 and 4, but showing the circuit in a third mode.

Referring now to FIGS. 3, 4 and 5, power and control circuitry 100 is shown in the first, second and third modes, respectively. The modes are selected by moving the mode selection switch 70 to the first, second and third positions, 72, 74 and 76. The windows 16, 18, 24 and 26 are driven by electric motors 102, 104, 106 and 108, respectively. The electric motors 102-108 are energized through motor switches 110, 112, 114 and 116, respectively. The motor switches each have terminals 1, C, 2 and 3, which correspond to terminals 1, C, 2 and 3 in the mode selection switch 70. The mode selection switch 70 and motor switches 110-116 are ganged by conventional means to operate simultaneously as a single switch assembly.

In the power and control circuit 100, the left side components comprised of the motors 102 and 106, motor switches 110 and 114 and the operating switches 40 and 52 are wired to the mode selection switch 70 in substantially identical fashion as the right side components, comprised of the motors 104 and 108, motor switches 112 and 116 and operating switches 42 and 54. In addition, the left front components comprising the motor 102, motor switch 110 and operating switch 40 are wired to the mode selection switch 70 in substantially an identical fashion as the right front components comprised of the motor 104, motor switch 112 and operating switch 42. It is likewise the case that the left rear motor 106, motor switch 114 and operating switch 52, are wired substantially identically to the right rear components comprising the motor 108, motor switch 116 and operating switch 54.

While the lamps are shown as pairs of lamps 80-82, 88-90 and 84-86, the instant invention contemplates using but a single lamp for each pair of doors to indicate which of the operating switches 40, 42; 52, 54 are active and the functions they perform.

Figure 6:
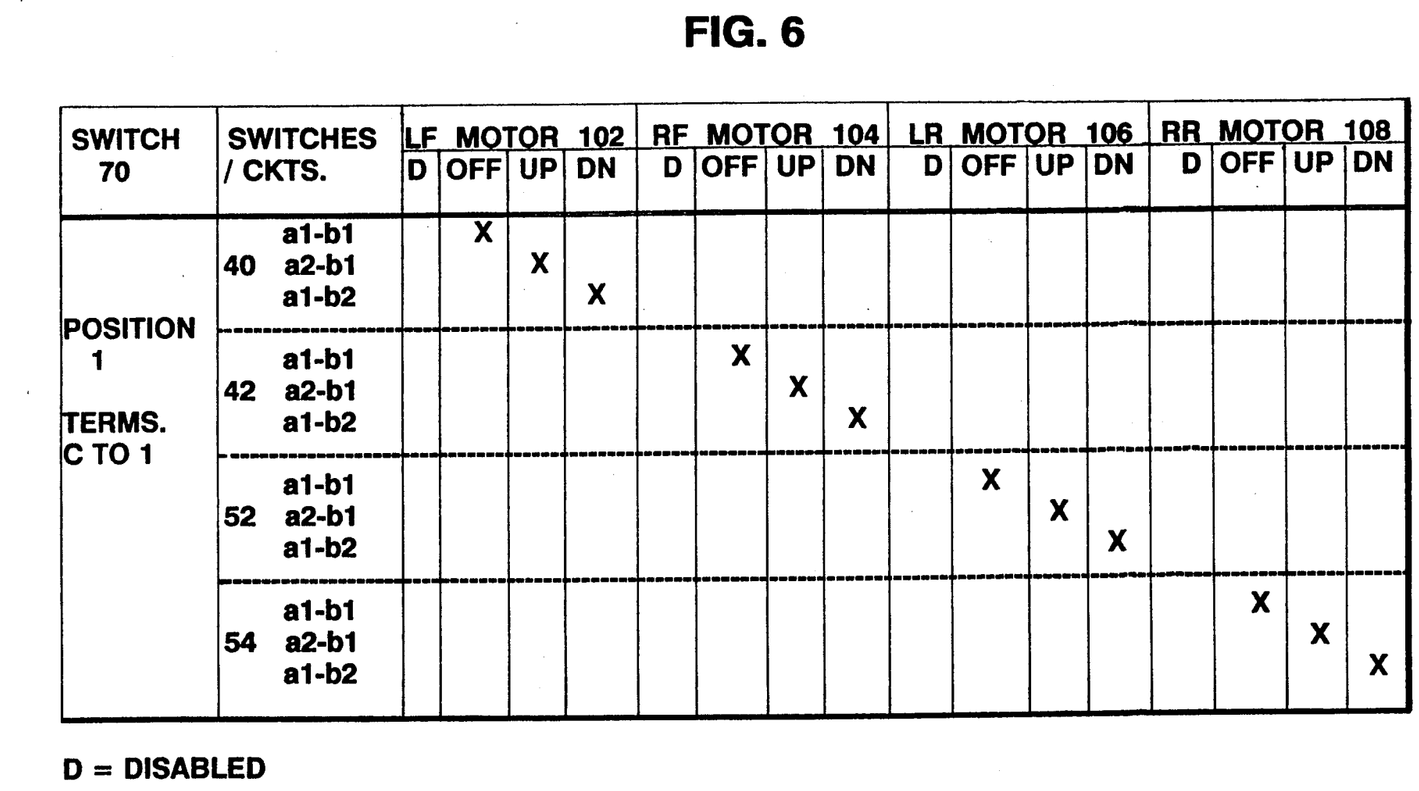
FIG. 6 is a truth table for the circuit when in the first mode of FIG. 3.

Considering now the first mode, wherein the power and control circuitry 100 is configured as is shown in FIG. 3 and the truth table of FIG. 6 applies, it is seen that pairs of contacts 120 and 122 in the mode selection switch 70 and the motor switches 110, 112, 114 and 116 each connect terminals C to terminals 1. As a result, 12-volt direct current from a power source line 130 is available to operate all of the motors 102-108 upon operating any of the buttons 44, 46, 50, 48, 56, 58, 60 and 62, in their respective operating switches 40, 42, 52 and 54. In addition, the 12-volt direct current illuminates the left and right front lamps 80 and 82, as well as the primary left and right rear lamps 84 and 86.

Considering the current flow specifically, current on the power line 130 is connected via line 132 to a front bus 134 and to a rear bus 136 to provide current to terminals 2 in the operating switches 40, 42, 52 and 54. In addition, current is supplied by lines 140 and 142 to the terminals C in mode selection switch 70. When either of the buttons 44 or 46 in the operating switch 40 is pressed or either of the buttons 50 or 48 in the operating switch 42 is pressed, terminal a or terminal b in the operating switch 40 or 42 is connected to terminal 2. Actuating switches 44 or 46 causes current from terminal 2 of switch 40 to flow through motor switch 110 and motor 102 to ground 150. In the same fashion, actuating switches 48 or 50 causes current from terminal 2 of switch 42 to flow through motor switch 112 and motor 104 to ground 150 pushing button 46 lowers the left front window 16 and button 44 raises the left front window 16; pushing button 50 lowers the right front window 18 and button 48 raises the right front window.

With respect to raising and lowering the rear windows 24 and 26, when either the button 58 or button 56 in the left rear operating switch 52 is pressed or either the button 60 or 62 in the right rear window operating switch 54 is pressed, the motor terminals a or b are connected to hot terminal 2 so that current flows from the terminals 2 through the motors 106 or 108 to ground at 160. Consequently, any of the operating switches 40, 42, 52 or 54 may operate its respective window and, as is indicated in the truth table of FIG. 6, none of the motors or switches is disabled.

The left front lamp 80 and right front lamp 82, as well as the primary left rear lamp 84 and primary right rear lamp 86 are illuminated. This is because the current on line 142 flows through contact 120 and lines 160 and 162 to the lamps 84 and 86 and flows from line 140 through contact 122 and lines 164 and 166 to the lamps 80 and 82. The secondary rear lamps 88 and 90 are not illuminated because the line 168 is connected to open terminal 3 in the mode selection switch 70.

Figure 7:
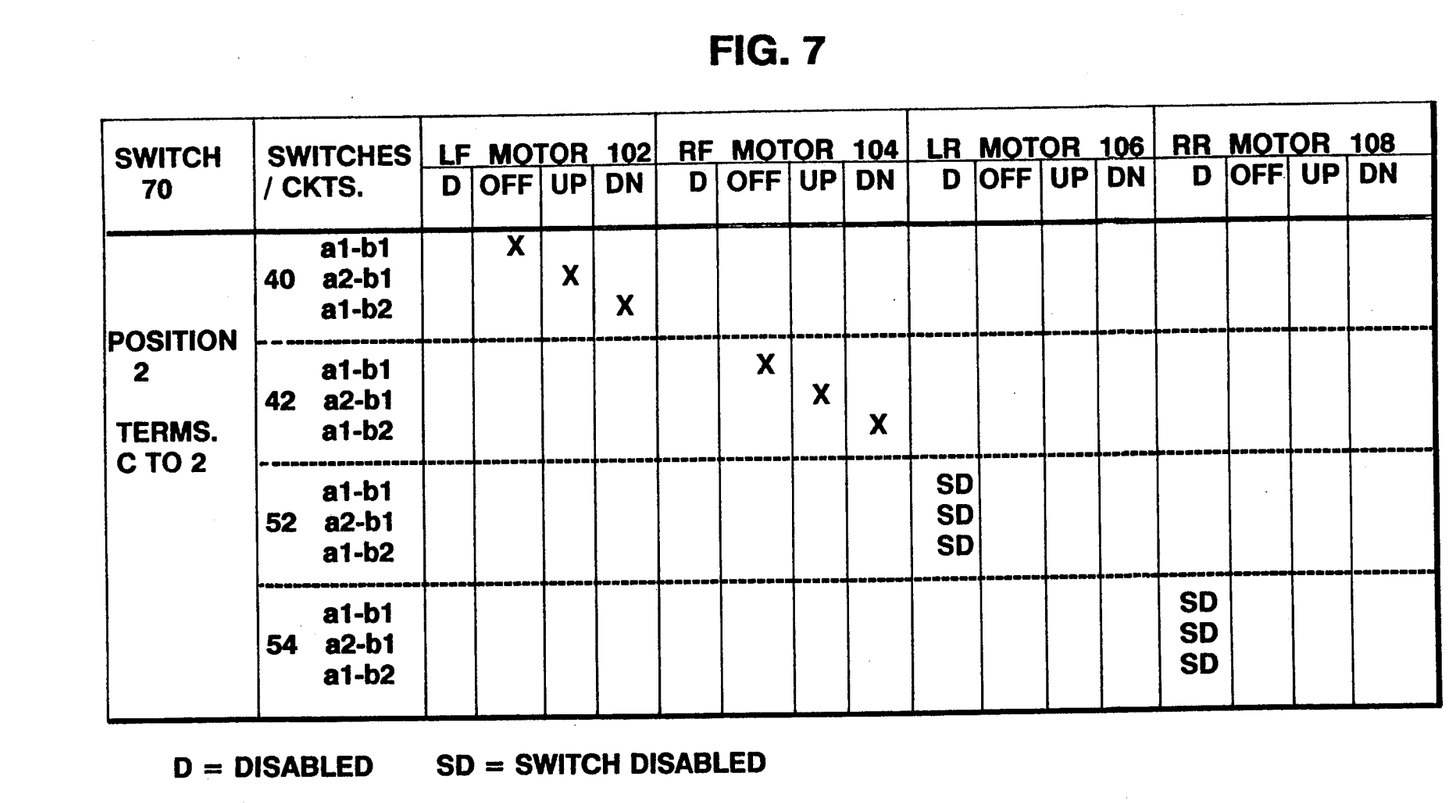
FIG. 7 is a truth table for the circuit when in the second mode of FIG. 4.

Referring now to FIG. 4 and the truth table of FIG. 7, it is seen now that the contacts 120 and 122 now span terminals C and 2 in mode selection switch 70 as well as in motor switches 110, 112, 114 and 116. When the contacts 120 and 122 are in the second mode (position 74 of FIG. 2), motors 102 and 104 are still connected to the source of current because jumpers 170 and 171 connect terminal 2 to terminal 1 in the left and right front motor switches 110 and 112. However, the left and right rear motor switches 114 and 116 are open because lines 176, 200, 177 and 202 are connected to terminal 1 of these switches and there is no jumper in the rear motor switches between terminal 1 and terminal 2. Accordingly, the left and right rear motors 106 and 108 for the left and right rear windows 24 and 26 are inoperable by the operating switches 52 and 54.

When the power and control circuitry 100 is in the second mode, the only lamps lit are the left front and right front lamps 80 and 82, respectively. This is because the line 164 is connected by contact 122 and jumper 180 to the power source line 130. The primary rear lamps 84 and 86 and the secondary left and right lamps 88 and 90 are not lit because the lines 160 and 168, respectively, are connected to open terminals 1 and 3 in the mode selection switch 70. As is seen in the truth table of FIG. 7, the left rear motor 106 and the right rear motor 108 are disabled because the switches 52 and 54 are disabled so that, in the second mode, only the front windows 16 and 18 are operable.

Figure 8:
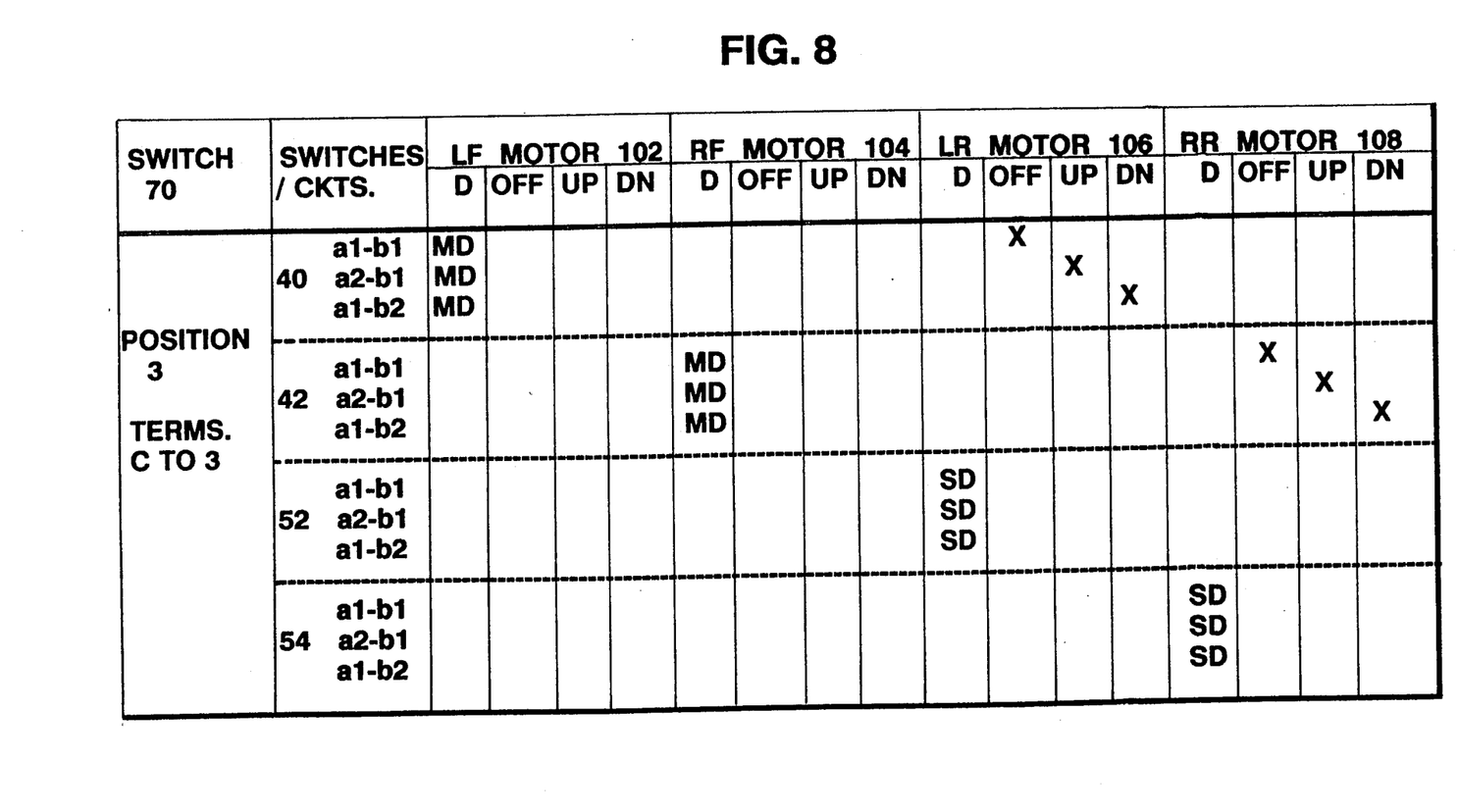
FIG. 8 is a truth table for the circuit when in the third mode of FIG. 5.

Referring now to FIG. 5 and to the truth table of FIG. 8, the power and control circuitry 100 is in the third mode where the left and right operating switches 40 and 42 operate only the rear windows 24 and 26, respectively. When in the third mode, the contacts 120 and 122 connect terminals C to terminals 3 in the mode selection switch 70 as well as the motor switches 110, 112, 114 and 116. When the contacts 120 and 122 connect terminals C to terminals 3 in motor operating switch 110, the motor operating switch 110 is disconnected from the left front motor 102 and is connected to the left rear motor 106. This is because the jumpers 170 and 171 are open at terminal 2, terminal 2 having been bypassed upon connecting terminal C to terminal 3. Terminal 3 is connected by lines 190 and 192 to the motor switch 114 on the left side of the Vehicle and by lines 194 and 196 to motor switch 116 on the right side of the vehicle. Lines 190, 192, 194 and 196 are connected to terminal 3 in motor switches 114 and 116 respectively so that contacts 120 and 122 take current from terminal 3 to terminal C and through the motors 106 or 108 upon pressing any one of the buttons 44, 46, 48 or 50 in the front operating switches 40 and 42. The rear operating switches 52 and 54 are disabled because lines 176 and 200 are connected to open terminals 1 in motor switch 114 and lines 177 and 202 are connected to open terminals 1 in rear operating switch 116. When the circuitry 100 is in the third mode, the only indicating lamps lit are the secondary left rear lamp 88 and the secondary right rear lamp 90. This is because the only line to indicating lamps energized is line 168 which is energized because contact 120 takes current from terminal C to terminal 3 and line 168. Left front lamp 80 and right front lamp 82 are not lit because line 164 is connected to open terminal 2 via jumper 180 connected to open terminal 1. The primary left rear lamp 84 and primary right rear lamp 86 are not lit because line 160 is connected to terminal 1 in mode selection switch 70 and terminal 1 is open.

As is seen in the third mode truth table of FIG. 8, the left and right front motors 102 and 104 are disabled and the left and right operating switches 25 and 54 are disabled so that the only operating switches and motors functioning are operating switches 40 and 42 and motors 106 and 108.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A power window system for a vehicle having left and right front electrically operated windows and left and right rear electrically operated windows; wherein each window is raised and lowered by an electric motor operated by an operating switch; wherein each operating switch is controlled by a motor switch; and wherein the vehicle has a driver's seat proximate one of the front windows and a rear passenger seat proximate the rear windows, the power window system comprising:

a power supply line;

a main module located proximate the driver's seat and having thereon the operating switches for the front windows and a mode selection switch connected to the power supply line and movable between first, second and third positions;

means for mounting the operating switches for the left and right rear windows proximate the rear seat;

means for connecting all motor switches to the power line when the mode selection switch is in the first position whereby each window is operable by one of the operating switches specifically associated therewith;

means for disabling operation of the rear windows by means of the motor switches when the mode selection switch is in the second position while maintaining connection of the front window switches to the power line, whereby only the front windows are operable; and means for connecting motors which operate the rear windows to the operating switches for the front windows, while disconnecting the front motors from the front operating switches, when the mode selection switch is in the third position, whereby operation of the front operating switches operates the rear windows and not the front windows.

2. The power window system of claim 1, wherein when the mode selection switch is in the second position, the disabling means disables the rear operating switches so that the operation of the rear operating switches does not raise or lower the rear windows.

3. The power window system of claim 2, wherein when the mode selection switch is in the third position, the rear operating switches are disabled while the front operating switches are electrically connected to the rear motors, whereupon operation of the front operating switches raises and lowers the rear windows, the rear operating switches being disconnected from the rear motors.

4. The power window system of claim 3, wherein the front operating switches are electrically connected to the rear motors through the rear motor switches.

5. The power window system of claim 1, further comprising at least one front indicator lamp, at least one primary rear indicator lamp and at least one secondary rear indicator lamp, wherein the lamps are positioned on the module and wherein the system further comprises:

means for illuminating only the front indicator lamp and primary rear indicator lamp when the mode selection switch is in the first mode;

means for illuminating only the front indicator lamp when the mode selection switch is in the second position; and means for illuminating only the secondary rear indicator lamp when the mode control switch is in the third position.

6. The power window system of claim 5, wherein there are left and right front indicator lamps, left and right primary rear indicator lamps and left and right second rear indicator lamps.

7. The power window system of claim 6, wherein the vehicle is configured with a pair of front seats and the module is positioned between the front seats.

8. The power window system of claim 7, wherein the module has a front and a rear, wherein the indicator lamps are distributed thereon with the front and secondary rear indicator lamps disposed proximate the front of the module, the front operating switches being disposed proximate the front and secondary rear indicator lamps, the mode selection switch being disposed proximate the front operating switches and primary rear indicator lamps being disposed proximate the rear of the module.

9. The power window system of claim 8, wherein the mode selection switch is mounted for sliding movement between the first, second and third positions, and the operating switches are pushbutton or rocker switches.

10. The power window system of claim 9, wherein the motor switches and mode selection switch are ganged to operate simultaneously as a single switch assembly.

11. The power window system of claim 1, wherein the vehicle is configured with a pair of front seats and the module is positioned between the front seats.

12. The power window system of claim 11, wherein the module has a front and a rear, wherein the indicator lamps are distributed thereon with the front and secondary rear indicator lamps disposed proximate the front of the module, the front operating switches being disposed proximate the front and secondary rear indicator lamps, the mode selection switch being disposed proximate the front operation switches and primary rear indicator lamps being disposed proximate the rear of the module.

13. The power window system of claim 12, wherein the mode selection switch is mounted for sliding movement between the first, second and third positions, and the operating switches are pushbutton or rocker switches.

14. The power window system of claim 13, wherein the motor switches and mode selection switch are ganged to operate simultaneously as a single switch assembly.

15. The power window system of claim 1, wherein the motor switches and mode selection switch are ganged to operate simultaneously as a single switch assembly.

* * * * *